Warren A. Alexander INVENTOR.

Jan. 30, 1968  W. A. ALEXANDER  3,366,781
PROCESSING SEISMIC DATA BY OPTICAL SCANNING
Filed Aug. 17, 1962  2 Sheets-Sheet 2

Warren A. Alexander INVENTOR.

BY James E. Reed
ATTORNEY

3,366,781
PROCESSING SEISMIC DATA BY OPTICAL SCANNING

Warren A. Alexander, Tulsa, Okla., assignor, by mesne assignments, to Esso Production Research Company, Houston, Tex., a corporation of Delaware
Filed Aug. 17, 1962, Ser. No. 217,722
2 Claims. (Cl. 235—181)

The present invention relates to seismic prospecting and is particularly concerned with an improved system for processing seismic data. In a preferred embodiment, the invention relates to a system for the cross-correlation of seismic signals.

Many of the difficulties encountered in analyzing and interpreting seismic data are due to the generation of "noise" in the near surface layers underlying the areas in which such data are obtained. Random waves, horizontal waves travelling near the surface, and multiple reflections from shallow interfaces having high reflection coefficients all give rise to changes in the amplitude of signals returned to the earth's surface in response to a seismic impulse at or near the surface. These changes tend to distort and obscure changes in amplitude due to the arrival of energy from prominent subsurface discontinuities. Cross-correlation is one of the methods which have been used to distinguish changes of the latter type from noise. By reproducing two signals simultaneously so that seismic events in one tend to reinforce events in the other and random noise in one tends to cancel noise in the other, it is often possible to detect significant events despite a poor signal-to-noise ratio. This is generally done by playing back the signals from a magnetic tape recorder and combining them to determine the extent to which they correlate with one another. By shifting the two signals with respect to one another until maximum correlation over the interval of interest is obtained, significant events not otherwise apparent can often be detected. This process is time consuming and expensive because of the necessity for repeatedly reproducing the signal and hence cross-correlation techniques have been employed for analyzing and interpreting seismic signals to only a limited extent.

It is therefore an object of the present invention to provide an improved system for processing seismic data. Another object is to provide a data processing system which will permit the correlation of seismic traces more rapidly than has generally been possible in the past. A further object is to provide a system for rapidly cross-correlating traces recorded in variable density, variable area or variable color form. Still other objects will become apparent as the invention is described in greater detail hereafter.

In accordance with the invention, it has now been found that many of the difficulties encountered in cross-correlating seismic signals in the past can be avoided by repeatedly scanning selected intervals on two or more traces of a seismic record to produce simultaneous electrical signals, combining these signals with one another, repeatedly integrating the combined signal over the time interval scanned, and displaying the output signal. The magnitude of the output signal thus obtained is an indication of the extent to which the traces coincide. By shifting the intervals scanned on at least one of the traces and observing changes in the output signal, the traces can thus be readily cross-correlated. This system permits rapid detection of seismic events on records characterized by poor signal-to-noise ratios and may considerably simplify the cross-correlation of records difficult to correlate by other means. By utilizing two identical traces of the same signal, the system of the invention can be used for autocorrelation.

The method of the invention is preferably carried out by optically scanning short intervals on two or more variable density, variable area or variable color or similar seismic traces on which a change in signal amplitude is indicated by a change in trace quality at a repetition rate between about 1 and about 500 times per second. Repetition rates between about 5 and about 50 times per second are particularly effective. The trace interval scanned will normally be an interval equivalent to between about 0.05 and about 0.5 second of trace time. The scanning interval will depend somewhat upon the geological zone of interest. If the zone is a thin one, a short interval will suffice. If, on the other hand, it is a faulted or folded zone, a longer interval will normally be required. The interval selected will also depend upon the time scale employed in recording the traces. Where small scales are used, relatively short scanning intervals will normally be employed. If the time scale is large, on the other hand, a longer scanning interval may be more satisfactory.

The scanning operation is normally carried out with a photoelectric cell or similar photosensitive transducer capable of generating an electrical signal proportional to the amplitude of a seismic signal recorded in variable density, variable area or variable color. Electrical signals containing information scanned from two or more traces are thus produced. These signals are added or cross multiplied to obtain a composite signal which is repeatedly integrated over the interval scanned. The integration is carried out at a repetition rate corresponding to that used in scanning the traces. The integrated output signal is then measured by means of a suitable meter, displayed on an oscilloscope, or recorded. Changes in the location of the interval scanned on one or more of the traces will produce a change in the output signal. By noting the time difference between the scanning intervals over which maximum values of this signal are obtained, the time interval necessary for best correlation of the traces can readily be determined.

Since autocorrelation and cross-correlation are essentially filtering processes, the method and apparatus of the invention can also be used for filtering seismic data. By repeatedly scanning an interval on one trace representing the desired filter function, simultaneously scanning successive intervals on a second trace representing the signal to be filtered, combining the resultant signals, and integrating the product, an output signal representing the filtered signal desired can be obtained. This system has advantages over the use of conventional systems in that the apparatus can be employed to create filters difficult to create by other means and can be switched from one filter function to another by simply changing a trace. The invention thus provides a simple and yet highly versatile filter.

The nature and objects of the invention can best be understood by referring to the following detailed description of the apparatus employed and to the accompanying drawing, in which.

Figure 1:
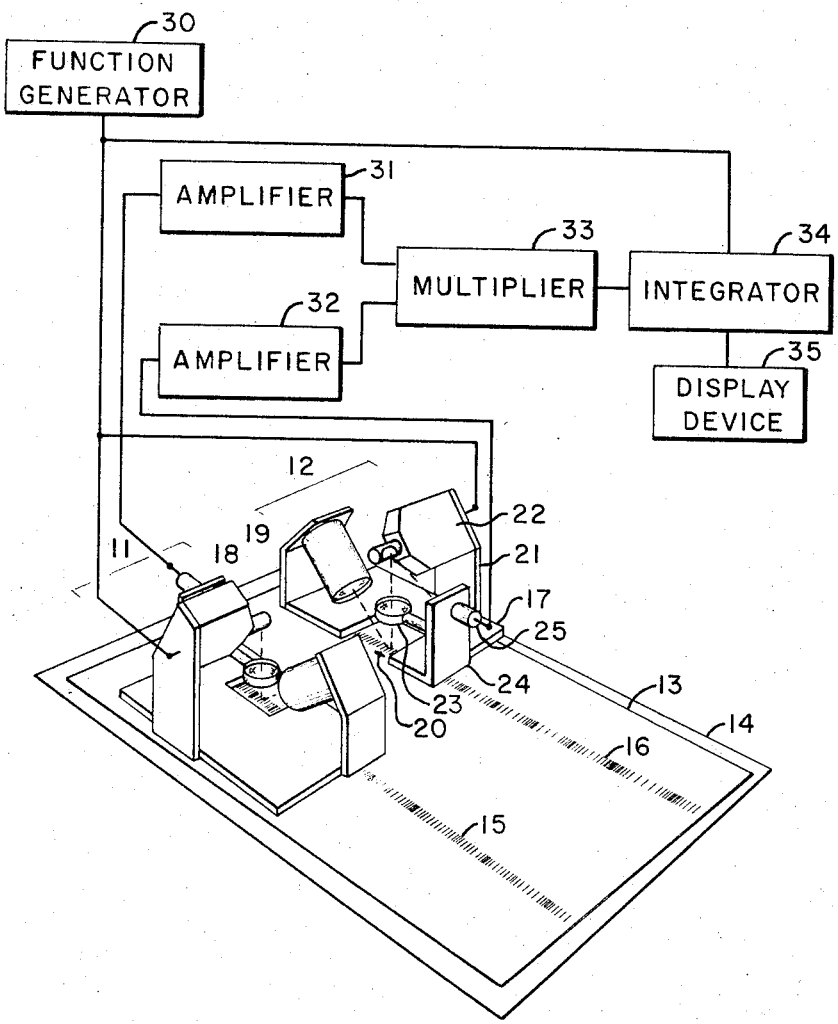
FIGURE 1 is a schematic diagram of apparatus which may be used for the optical scanning and correlation of seismic traces in accordance with the invention.

The apparatus shown in FIGURE 1 of the drawing includes scanning units 11 and 12 positioned on a photographic print 13 of a seismic record which in turn rests upon a table or similar working surface 14. The record includes variable density traces 15 and 16. Although only two traces are shown for purposes of illustration, the record will normally include 12 or more individual traces arranged side by side to form a conventional seismic section. Each trace is essentially an indication of changes in the amplitude of the recorded seismic signal with time. The two scanning units shown are identical and hence only one will be described in detail. Each unit includes a base 17, a light bracket 18 extending upwardly from the base, and a light source 19 mounted on the light bracket. The light source may be a conventional incandescent bulb located within a housing containing a focusing lens. The source is positioned to permit the creation of a bright area on the record within a cut-out section 20 in the base of the scanning unit. A galvanometer bracket 21 is affixed to the base and supports a reflecting mirror galvanometer 22 above the cut-out section so that light reflected from the seismic record impinges on the galvanometer mirror. The axis of rotation of the mirror extends at right angles to the time axis of the traces on the record. The galvanometer assembly may be of conventional design. A lens 23 is supported between the mirror and record to focus light reflected from the record. The focusing lens is mounted on bracket 24 which is affixed to the base. A photoelectric cell or similar photosensitive transducer 25 is mounted on bracket 24 in a position such that light reflected from the galvanometer mirror will fall upon the light sensitive surface of the transducer and result in the generation of an electrical signal. Any of a number of photoelectric cells and similar photosensitive transducers commercially available will be suitable for purposes of the invention and may be employed.

The reflecting mirror galvanometers in the scanning units shown in FIGURE 1 are actuated by an electrical signal from an external function generator 30. The function generator may be of conventional design and may produce a sawtooth waveform, a sine wave, a triangular waveform or a similar sweep signal. The output signal from the function generator causes the galvanometers to oscillate at a frequency corresponding to that of the signal. This determines the repetition rate at which the scanning units operate. In utilizing a system of this type, it is preferred to employ repetition rates between about 1 and about 500 times per second and hence the function generator will normally operate at a frequency between about 1 and about 500 cycles per second. Frequencies outside this range may be utilized in some cases, however. The amplitude of the output signal from the function generator is controlled so that the galvanometer mirror will be deflected through a distance sufficient to sweep an interval equivalent to about 0.05 and about 0.5 second on the seismic trace. Since the galvanometers in both the scanning units are controlled by the output signal from function generator 30, the interval scanned and the repetition rate will be the same in both units.

The electrical signals generated by the photoelectric cells or similar photosensitive transducers 25 in the scanning units in response to light impinging on the light sensitive surfaces of the transducers are fed to amplifiers 31 and 32. The amplifiers may be of conventional design and serve to increase the output voltage from the photosensitive transducers to a useable level. The amplified output signals obtained from amplifiers 31 and 32 are fed to a multiplier circuit 33 where one is multiplied by the other. The multiplier may consist of conventional circuitry. In lieu of a multiplier, an adding circuit may be employed to combine the amplified signals. The use of an adder normally gives results which closely approximate those obtained when a multiplier is used and are sufficiently accurate for most purposes. The product signal from the adder or multiplier is then fed to integrator 34. The integrator employed is provided with a zeroing circuit actuated by function generator 30 so that the product voltage from the adder or multiplier is repeatedly integrated at a frequency corresponding to the sweep frequency or repetition rate of the scanning units. The integrated signal interval thus corresponds to the signal interval scanned. Integrators provided with zeroing circuit which may be used for this purpose have been described at length in the literature. One such device is marketed as GAPR Model J by George A. Philbrick Researches, Inc., 127 Clarendon St., Boston, Mass. Similar devices utilizing mechanical relays and other systems in lieu of electronic circuits for zeroing purposes are also well known and will be familiar to those skilled in the art.

The integrated output signal derived from integration unit 34 is fed to a presentation or display device 35. This device will normally consist of a voltmeter from which the amplitude of the integrated signal can be read but an oscillograph or oscilloscope can be utilized to record or display the signal if desired. Since the proper time relationship between the traces on the record is indicated when maximum values of the output signal are obtained, the use of a meter on which small changes in signal amplitude can readily be detected is preferred.

In utilizing the apparatus depicted in FIGURE 1 of the drawing, the operator first places the scanning units 11 and 12 on the seismic record 13 with respect to which the cross-correlation operation is to be carried out. Each scanning unit is positioned on one of the traces on the record so that light from the light source 19 thereon will fall upon the trace and be reflected back to the photoelectric cell or similar transducer 25. The light sources and the function generator 30 are then energized. As the galvanometers 22 oscillate in response to the sweep signal from the function generator, a short interval on each trace is scanned repeatedly. The electrical signals generated by the photoelectric cells in response to light reflected by the galvanometer mirrors are amplified in units 31 and 32 and multiplied by one another in multiplier circuit 33. The composite signal thus obtained is integrated in integration unit 34 and the integrated signal is passed to meter or similar display device 35.

After noting the signal amplitude indicated by the meter, the operator moves one of the scanning units a short distance along the trace on which it is positioned. This movement of the unit results in a change in the portion of the trace scanned by it and is therefore accompanied by a change in the value indicated on the meter. The shifting of one scanning unit with respect to another in this manner is continued until a maximum output signal on the meter is obtained. The record time between the intervals scanned on the two traces at this point corresponds to the time correction required for best cross-correlation of the traces. This time difference can readily be determined by marking the positions of the two scanning units on the record and measuring the distance between them on the axis of one of the traces with a scale corresponding to the time scale employed in preparing the record. Alternately, the scanning units employed may be linked with one another and provided with scales so that the record time by which one scanning unit is displaced from the other can be read directly. In either case, a cross-correlation of the two traces can be quickly obtained. Other traces on the record are then cross-correlated in similar fashion.

In utilizing the apparatus of FIGURE 1 for autocorrelation, the scanning units are positioned on two identical traces of the same signal. An interval on each trace is scanned and the magnitude of the output signal is noted or recorded. By then shifting one scanning unit with respect to the other until a maximum output signal is obtained, an autocorrelation of the trace can be obtained.

The apparatus of FIGURE 1 can be utilized as a filter by recording the desired filter function on a film or print over an interval equivalent to that scanned by the scanning units. The filter function may be recorded in variable density, variable area or variable color so that it corresponds to the signal to be filtered. One scanning unit is then positioned on the trace containing the filter function so that the function will be scanned repeatedly. The other scanning unit is then moved slowly over the length of the trace containing the signal. The resultant output signal recorded on display device 35 represents the filtered signal. As pointed out earlier, this system can be utilized to create any filter for which a filter function can be recorded and can be converted from one filter to another by simply substituting a trace containing one filter function for one containing another. Specific portions of a signal can readily be filtered without the necessity for filtering the entire signal. The system thus provides an extremely versatile filter which is much simpler and considerably less expensive than many filtering systems employed in the past.

Figure 2:
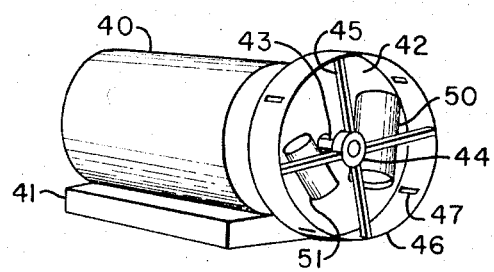
FIGURE 2 shows an alternate form of scanning device.

FIGURE 2 of the drawing depicts an alternate scanning unit which may be employed in lieu of the galvanometer-type units described above. The apparatus of FIGURE 2 includes a fractional horsepower electrical motor 40 mounted upon a base member 41 which can be moved over the surface of the seismic record. The motor employed is preferably a small synchronous motor powered by signals from a suitable alternator or oscillator. The use of a single oscillator to drive two such motors simultaneously assures operation of the motors in phase. The motor speed can be controlled by regulating the oscillator frequency. A circular plate 42 containing an opening at its center fits over the shaft 43 of the motor and is connected to the end bell or housing of the motor in fixed position. The plate is thus mounted in a plane perpendicular to the longitudinal axis of the motor. A rotating aperture assembly is mounted on the shaft outside the plate. The aperture assembly includes a hub 44, supporting arms 45 extending radially from the hub near the outer end of the shaft, and an annular sleeve 46 to which the outer ends of the supporting arms are connected. The sleeve contains slits 47 spaced at regular intervals about its circumference. The length of each slit corresponds to the width of a trace on the seismic record to be scanned. Each slit will normally be from about 1/64 to about 1/8 inch in width. The width used will depend primarily upon the time scale of the trace to be scanned. Narrow slits will normally be used where the time scale is small; whereas relatively wide slits will be employed with a large time scale. The number of slits provided will depend upon the motor speed and the scanning rate desired. A sleeve containing four slits as shown in FIGURE 2 for example, will give a scanning repetition rate of 4 times per second if the motor is operated at a speed of 60 revolutions per minute. A sleeve containing eight slits rotated at a speed of 360 revolutions per minute will permit scanning at a repetition of 48 times per second. A light source 50 including a bulb, housing, and focusing lens is mounted on plate 42 to direct a beam of light toward the record on which the scanning unit is positioned. The light passes through the slits in the sleeve as it is rotated. Light reflected from the record passes upwardly through the slits in the rotating sleeve to a photoelectric cell or similar photosensitive transducer 51 mounted on plate 42. The light source and photoelectric cell must be mounted on the plate so that light can readily pass to and from the record through the slits as the sleeve rotates. The inner surface of the sleeve will preferably be provided with a dull black finish to minimize the reflection of light from the surface of the sleeve to the photoelectric cell.

Two scanning units of the type described above are shown in FIGURE 3 of the drawing. The two units, designated by reference numerals 60 and 61, are positioned on an opaque print of a seismic record 62 including variable density traces 63 and 64. Again only two traces are shown but it will be understood that the record will normally contain many traces closely spaced with respect to one another to form a conventional seismic section. The two scanning units are powered by a signal from oscillator 65. Electrical signals generated by the photoelectric cells in the scanning units are fed to amplifiers 66 and 67. The output signals from the amplifiers are passed to multiplier 68. The product signal is then fed to a zeroing type integrator 69 controlled by the signals from oscillator 65. The repetition rate of the zeroing circuit in the integrator corresponds to the repetition rate of the scanning units. The interval scanned on the record and the signal interval integrated are thus identical. The integrated output signal is then fed to a meter or a similar device 70 on which maximum values can be detected.

Figure 3:
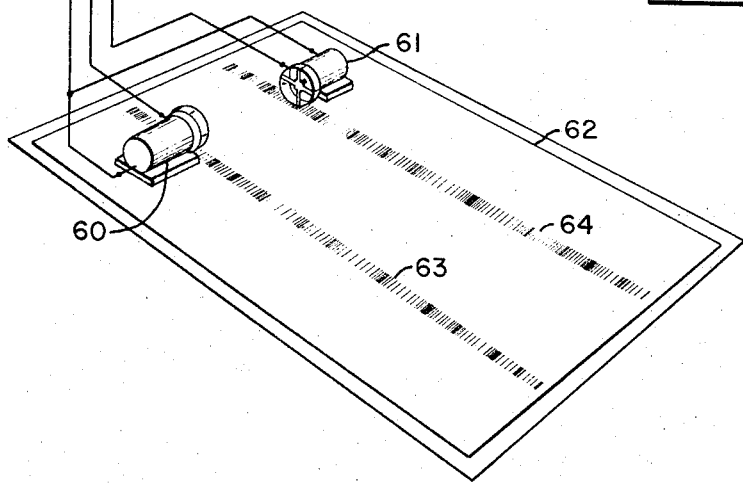
FIGURE 3 is a schematic diagram of other apparatus including the scanning unit of FIGURE 2 useful in practicing the invention.

The apparatus shown in FIGURE 3 of the drawing is employed in a manner similar to that in which the equipment of FIGURE 1 is used. Scanning units 60 and 61 are first placed on the traces which are to be cross-correlated. Each unit is located so that light from the source mounted thereon will impinge on the trace and be reflected back to the photoelectric cell as the sleeve of the unit rotates in the plane parallel to the longitudinal axis of the trace. After the scanning units have been positioned, the system is energized by starting oscillators 65. Electrical signals are generated by the photoelectric cells in the two units in response to the repeated scanning of short intervals on the traces. These signals are amplified in units 66 and 67 and fed to multiplier 68. The product signal from the multiplier is integrated in circuit 69 over intervals corresponding to those scanned on the record. The integrated product is fed to meter 70. After a reading has been obtained on the meter, the position of one or both of the scanning units is shifted along the traces and the effect on the value shown by the meter is observed. This shifting of scanning units and reading of the meter is continued until a maximum reading is obtained. The time difference between the scanned intervals indicates the time factor, generally referred to as $\tau$, required for best cross-correlation of the traces. This difference can be determined by reading the time scale on the record to locate the positions of the scanning units and then subtracting one value from the other. The scanning units might also be interconnected and provided with scales which permit a direct reading of the time difference. The apparatus can also be used for autocorrelation and for filtering as described earlier.

Although the invention has been described above in terms of the scanning of opaque seismic records, it will be apparent that the apparatus disclosed can also be employed for scanning translucent or film type records. The apparatus shown in FIGURE 1 can be employed with records of the latter type by placing the record on a flat surface illuminated from below and utilizing the light transmitted through the record for scanning purposes. The transmitted light will impinge on the galvanometer mirror and be reflected to the photoelectric cell to produce the required electrical signal and hence the light source mounted on the scanning unit can be disconnected. The scanning device shown in FIGURE 2 of the drawing can be used in similar manner. Light transmitted through a translucent record from a source located below the record will pass through the slits as the sleeve of the scanning unit rotates and will activate the photoelectric cell to produce the electrical signal. An alternate procedure is to mount the translucent record on an aluminum or similar reflecting surface and scan it with incident light from a source mounted on the scanning unit as shown in FIGURES 1 and 2. Light will be reflected from the surface beneath the film and returned to the photoelectric cell in a scanning unit used to produce the electrical signal. The invention is not restricted to the use of the particular scanning units shown. Other optical scanning units which may be employed include motor-driven prisms having several mirror surfaces arranged so that light reflected from the mirror surfaces scans the interval of interest, flying spot scanners, and similar cathode ray tube scanning devices. These and similar modifications of the invention will be apparent to those skilled in the art after reading the above disclosure.

What is claimed is:

1. Apparatus for processing seismic data which comprises optical means for repeatedly scanning intervals of equal time duration on two traces at the same rate and generating simultaneous electrical signals indicative of information contained on said traces, means for combining said electrical signals with one another to obtain a composite signal, means for repeatedly integrating said composite signal over signal intervals equivalent to the intervals scanned on said traces and at a repetition rate equivalent to the repetition rate at which said intervals are scanned, and means for indicating the magnitude of the integrated signal, wherein said means for scanning comprises a motor having a rotatable shaft, a sleeve containing slits spaced about the sleeve periphery mounted on said shaft in a plane transverse to the longitudinal axis of said shaft, a light source positioned to direct light through said slits in said sleeve onto a seismic record as said shaft and sleeve rotate, and a photosensitive transducer positioned to receive light through said slits in said sleeve from said seismic record as said shaft and sleeve rotate.

2. Apparatus as defined by claim 1 wherein said photosensitive transducer is a photoelectric cell.

References Cited

UNITED STATES PATENTS

| | | | |
|---|---|---|---|
| 2,487,511 | 11/1949 | Bedford | 340—146.3 X |
| 2,820,173 | 1/1958 | Raabe | 315—9 |
| 2,688,124 | 8/1954 | Doty et al. | 340—15 |
| 2,854,191 | 9/1958 | Raisbeck | 235—181 |
| 2,839,149 | 6/1958 | Piety | 181—0.5 |
| 2,664,243 | 12/1953 | Hurvitz | 235—61 |
| 2,676,206 | 4/1954 | Bennett et al. | |
| 3,046,545 | 7/1962 | Westerfield | 235—181 X |

MALCOLM A. MORRISON, *Primary Examiner.*

A. J. SARLI, J. F. RUGGIERO, *Assistant Examiners.*